United States Patent [19]

Collins et al.

[11] 4,081,709
[45] Mar. 28, 1978

[54] ELECTROSTATIC COATING OF SILICA POWDERS ON INCANDESCENT BULBS

[75] Inventors: Clifford B. Collins; William G. James, both of Cleveland Heights, Ohio

[73] Assignee: General Electric Company, Schenectady, N.Y.

[21] Appl. No.: 633,936

[22] Filed: Nov. 20, 1975

[51] Int. Cl.² ............................................. H01K 1/32
[52] U.S. Cl. ................................. 313/116; 252/518; 252/521; 427/106; 423/335
[58] Field of Search ............ 252/518 R, 521; 106/52, 106/73.5; 313/116; 427/106

[56] References Cited
U.S. PATENT DOCUMENTS

| | | | |
|---|---|---|---|
| 2,661,438 | 12/1953 | Shand | 313/116 |
| 2,806,444 | 9/1957 | Werner et al. | 118/51 |
| 2,878,136 | 3/1959 | Gustin | 117/17 |
| 2,922,065 | 1/1960 | Meister et al. | 313/116 |
| 3,126,300 | 3/1964 | Bienefelt et al. | 118/49.1 |
| 3,320,460 | 5/1967 | Bouchard et al. | 313/112 |
| 3,909,649 | 9/1975 | Arsena | 313/116 |

*Primary Examiner*—Benjamin R. Padgett
*Assistant Examiner*—E. Suzanne Parr
*Attorney, Agent, or Firm*—Paul F. Wille; Lawrence R. Kempton; Frank L. Neuhauser

[57] ABSTRACT

An improved electrostatically deposited coating is obtained by controlling the particle size and resistivity of the silica powder.

12 Claims, 7 Drawing Figures

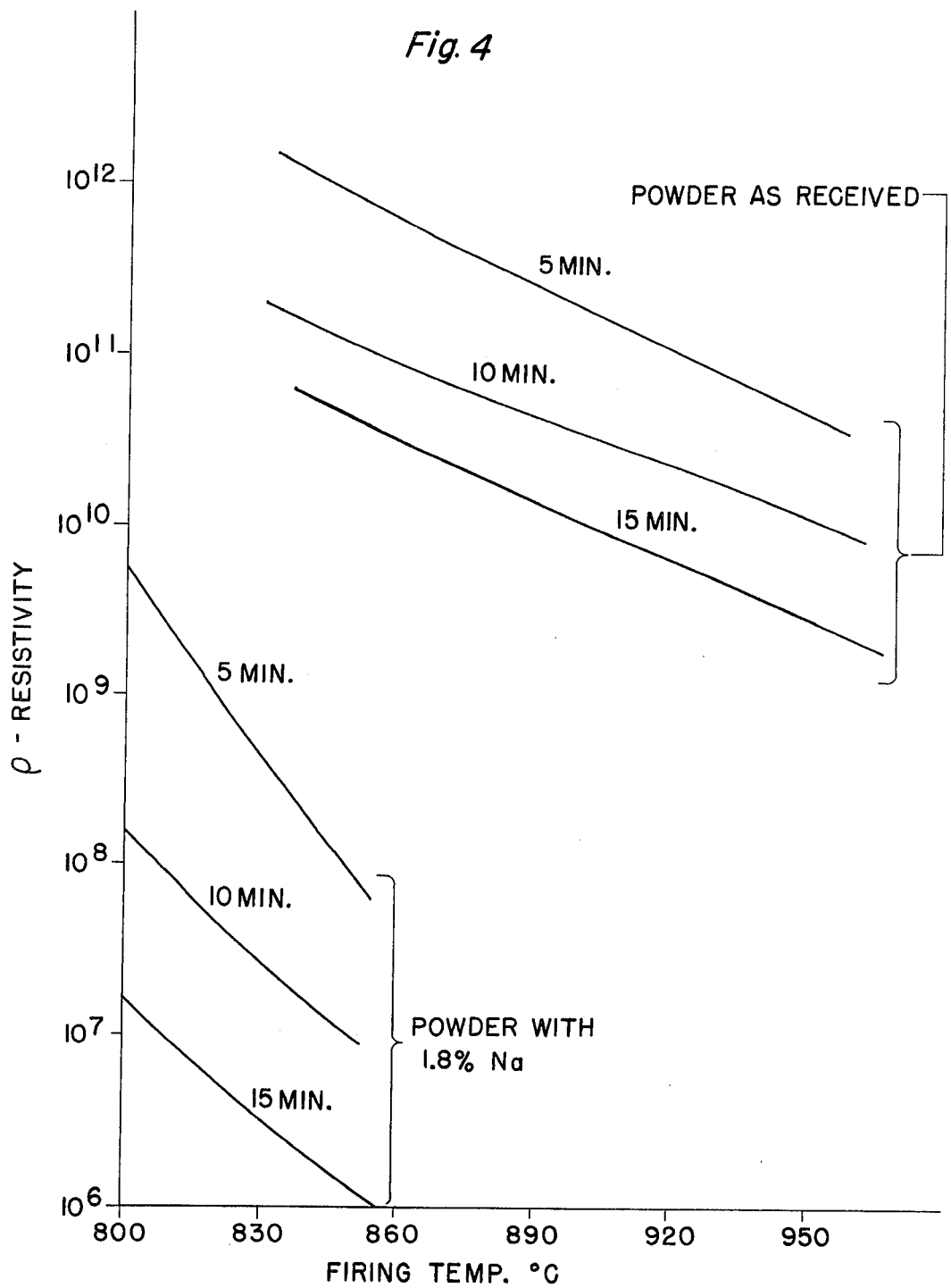

ELECTROSTATIC COATING OF SILICA POWDERS ON INCANDESCENT BULBS

BACKGROUND OF THE INVENTION

This invention relates to the manufacture of incandescent lamps and, in particular, to providing a light-diffusing coating on the bulb by electrostatic deposition.

As is known, it has long been desired to produce softer light from an incandescent source, i.e., produce less distinct shadows or have it seem that the light is produced by a distributed rather than point source. A solution to this problem was obtained by etching the inside of the bulb with acid. Later silica powder was used to coat the inside of the etched bulb, which further softened the light from the filament.

Neither of these approaches is entirely free from difficulty. For example, the acid etch slightly weakens the glass and the acid poses a materials handling problem.

A proposed alternative has been to electrostatically deposit silica particles to obtain a diffusion coating. One example of this is disclosed in U.S. Pat. No. 2,922,065, Meister et al. Meister et al are primarily concerned with lumen maintenance and disclose an electrostatically deposited, controllably hydroscopic layer of extremely fine (0.02–1$\mu$) silica particles. The hydroscopic characteristic is obtained by heating the silica particles to no more than 625° C to preserve a number of hydroxyl sites on the surface of the powder to which water molecules can later attach. The lack of these sites, produced by high firing temperatures, is believed to be the "inertness" referred to by Meister et al.

Lumen maintenance aside, the basic problem is to provide a diffusion coating that adequately diffuses the light and hides the filament without greatly decreasing lumen output. These, in turn, derive from the more basic operations of powder deposition and coating adherence, i.e., the coating must be sufficiently, but not overly, thick and must adhere during further manufacturing operations and during use. Prior art attempts at improving powder deposition and uniformity have been concerned with apparatus, such as U.S. Pat. Nos. 2,806,444 and 3,126,300, or with post-deposition treatment, such as U.S. Pat. Nos. 2,811,131 (steaming the coating to compact it) or 2,995,463 (using a follow-up electrostatic field to increase adherence), or with powder additives to prevent agglomeration as in U.S. Pat. No. 2,878,136. So far as is known, none are concerned with the powder and the deposition process per se.

SUMMARY OF THE INVENTION

It is therefore an object of the present invention to provide an improved coating material for incandescent lamps.

Another object of the present invention is to provide an improved powder for electrostatic coating.

A further object of the present invention is to provide an improved coating by controlling the resistivity and particle size of the coating powder.

The foregoing objects are achieved in the present invention wherein silica powder is coated on incandescent bulbs to produce coatings which adhere and which diffuse the light from the filament sufficiently that the filament cannot be seen. The powder is applied by electrically charging the particles negatively with respect to the bulb. The charged particles are conveyed to the bulb in an airstream whereupon electrostatic attraction causes the particles to form a layer on the bulb.

The glass bulb is heated to conductance (150° C to 300° C) prior to and during deposition to close the electric circuit and neutralize the particle charge. The preferred particle size is approximately two microns and the preferred resistivity of the particles is $10^8$ to $10^{11}$ ohm-cm. The preferred resistivity can be obtained by calcining the powder at from 800°–950° C for 5–15 minutes, not including heating and cooling, in an air atmosphere.

BRIEF DESCRIPTION OF THE DRAWINGS

A more complete understanding of the present invention can be obtained by considering the following detailed description in conjunction with the accompanying drawings, in which:

FIG. 4 illustrates the variation in resistivity with firing temperature for two powders.

DESCRIPTION OF THE PREFERRED EMBODIMENT

Figure 1:
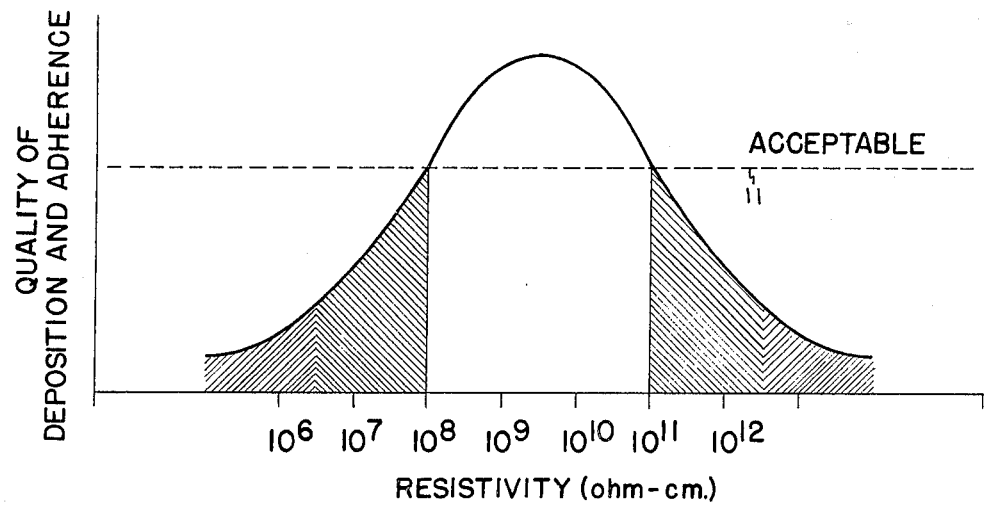
FIG. 1 broadly illustrates the relative performance of various powders of the same particle size but different resistivities.

While the prior art has concentrated on moisture content or surface area per unit weight of the particles, generally square meters per gram ($M^2/g$), it has been found that optimum coatings can be obtained by relying on the resistivity of the powder as a controlling parameter. As can be seen from the examples herein, there is virtually no correlation between moisture content and resistivity, i.e., resistivity cannot be predicted from moisture content.

In addition, while silica is the preferred coating material, other materials which have the appropriate resistivity and particle size can be used, such as alumina, aluminosilica, and calcium carbonate. Even with silica, it has been found that a wide variation in properties is obtained depending upon where the silica is from or how it was made. A broad distinction can be made, for example, between what is known as fumed silica and what is known as precipitated silica. As is known, precipitated silica has a higher moisture content, approximately 10%, and must be dried or calcined prior to use in lamp making.

In addition, silica is specified by particle size, which may refer to "ultimate particle size", i.e., the size of the smallest unresolved particle as seen on an electron microscope, or to the size of agglomerates of ultimate particles, e.g., as detected by a Coulter counter. As used herein, "particle size" refers to the agglomerates, "ultimate particle size" is referred to as such.

While specified herein by particle size and resistivity, the following silicas are described in conjunction with their respective trade names. LoVel is a precipitated silica available from PPG Industries, Inc. Various specific properties are indicated by a succeeding number, e.g., LoVel 27 has an ultimate particle size of about $0.04\mu$, 1–2.5% water content after calcining, and a measured resistivity of from $10^8$ to over $10^{11}$ ohm-cm after calcining. LoVel is a micronized form of HySil, another silica powder.

Imsil A-10 is a largely amorphous mined silica, available from Illinois Minerals Company, having an ultimate particle size of $1.6\mu$, about 0.25% water content, and a measured resistivity of about $10^8$ ohm-cm.

Novacite L207-A is also a mined silica, available from Malvern Minerals Company, having essentially zero water content. $3.6\mu$ ultimate particle size, and $10^9$ ohm-cm measured resistivity. Contrary to the general rule, this silica charges positively triboelectrically.

Ox-50 is a fumed silica, available from Degussa, Inc., having an ultimate particle size of $0.05\mu$, less than 1% water content, and greater than $10^{12}$ ohm-cm measured resistivity.

In the foregoing, the percentage water is by weight. Resistivity is measured with the powder compressed under a load of 10 kg per $cm^2$ with 500 volts across a powder thickness of 0.15–0.25 cm and a contact area of about 0.5 $cm^2$.

From the preceding, it is apparent that merely selecting a single material, e.g., silica, a variety of characteristics may be encountered. It has been found, however, that specifying the resistivity of the powder and the particle size produces optimum coatings, i.e., adequate diffusion and filament hiding with as little lumen loss (compared to a clear bulb) as possible. With powders of the present invention, lumen loss is less than 4%.

The various optical and electromechanical properties the powder must meet combine to produce a preferred particle size of 1–4 microns ($\mu$). This powder produces adequate diffusion (refraction), moderate back-scattering (reflection), good adhesion and resistance to blow-off during subsequent lamp-making operations.

FIG. 1 illustrates diagrammatically the variation in the quality of the coating with resistivity, other factors being equal. While acceptance level 11 is to some extent a subjective parameter, powders having a resistivity between $10^8$ and $10^{11}$ ohm-cm produce acceptable coatings.

The theory of operation is as follows: In order to be transported, the particles of powder must be charged a predetermined amount so that electrostatic forces will attract the particle to the wall of the bulb. Upon reaching the wall, the charge must dissipate so that the attraction between the partially coated wall and additional particles is not reduced. With resistivities below $10^8$ ohm-cm, the particles are believed to charge insufficiently and do not adhere well to the wall. Above $10^{11}$ ohm-cm, the particles do not dissipate their charge rapidly enough, resulting in corona holes. While indicated by vertical lines in FIG. 1, the boundaries on resistivity should not be construed to mean an abrupt deterioration in the quality of the coating. The change is gradual. Also, for example, the quality of the coating is dependent upon how rapidly one attempts to deposit it.

Figure 2:
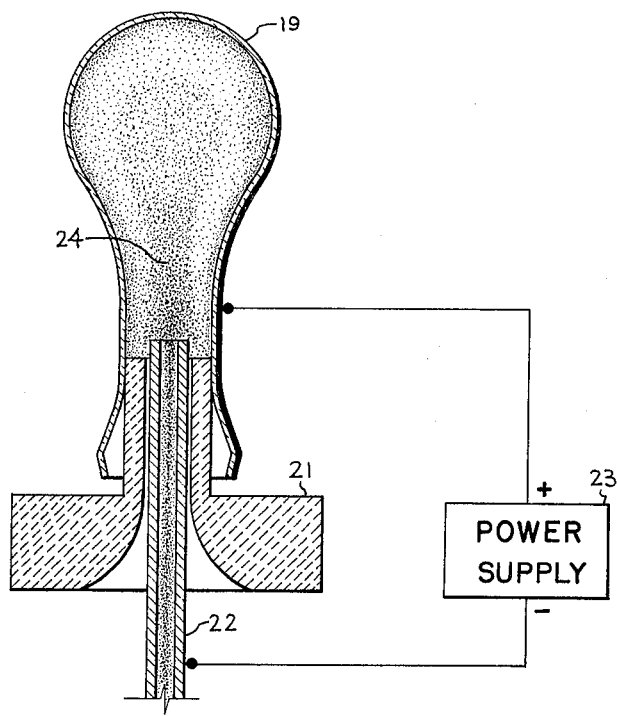
FIG. 2 illustrates the apparatus utilized in coating the interior of a bulb.

Apparatus for electrostatically coating lamps is well known in the art, the basic elements of which are illustrated in FIG. 2. Specifically, a lamp bulb 19 is held in place by chuck 21, which has a central aperture into which supply tube 22 is inserted. Supply tube 22 conveys the mixture of air and powder from a reservoir (not shown) to the interior of the bulb, the air pressure in the tube being higher than that in the bulb. Bulb 19 is heated to conductance, approximately 150° C or higher, and a high voltage from supply 23 is applied between supply tube 22 and bulb 19. Power supply 23 typically provides an output voltage of 26–33 kv. It is preferred that supply tube 22 be grounded and that the bulb be positive to simplify machine construction.

As previously noted, the quality of the coating is somewhat dependent upon the speed at which one attempts to coat the bulbs, i.e., the flow rate through supply tube 22. As a specific example and not by way of limitation, coating an A-19 bulb (area of about 11,500 $mm^2$) with 65–100 mg of powder in 0.9 seconds narrows the preferred resistivity range to $10^8$ to $10^{10}$ ohm-cm, while a slower rate, e.g., 1.3 seconds, shifts the preferred range to $10^9$ to $10^{11}$ ohm-cm.

Figure 3:
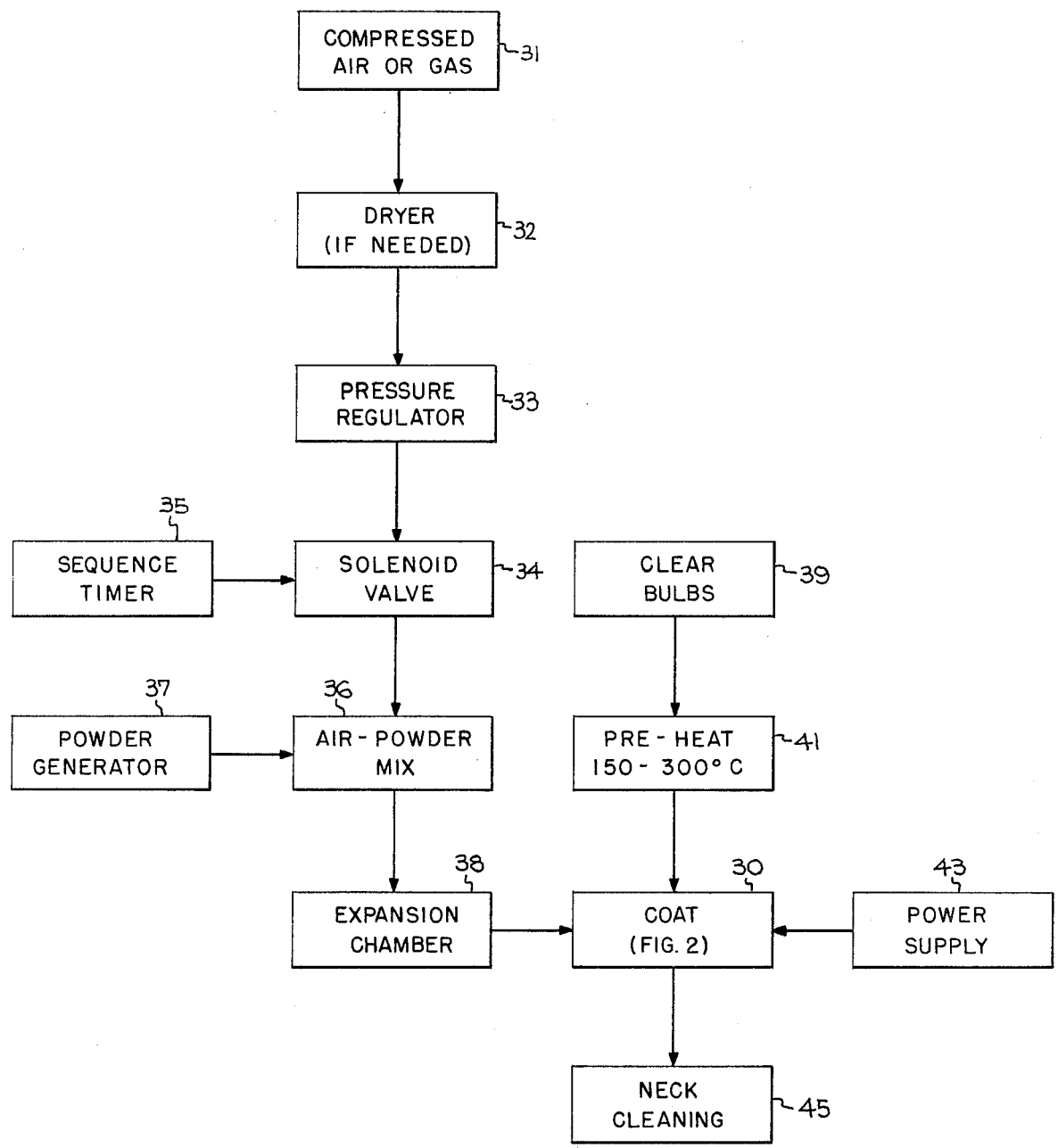
FIG. 3 is a block diagram and a flow chart of the apparatus and steps for coating a bulb in accordance with the present invention.

FIG. 3 illustrates in block diagram form the apparatus utilized in coating bulbs in accordance with the present invention. Basically, the raw materials of air or gas, powder, and clear bulbs converge upon coating apparatus illustrated in FIG. 2 and represented in FIG. 3 by block 30.

Specifically, compressed air or gas from a suitable source 31 is passed through a dryer 32, which may be omitted with most commercially available compressed air. From dryer 32, the air or gas passes through a pressure regulator 33 which, for example, maintains the pressure of the air or gas at approximately 4 bar (gauge). The regulated air is metered by a solenoid valve 34 under the control of sequence timer 35. Sequence timer 35 is synchronized with the feeding of clear bulbs to coating apparatus 30 so that the charge of powder is delivered to the bulb at the proper time.

The metered air from solenoid valve 34 enters airpowder mixture chamber 36 which receives powder from powder generator 37 which may, for example, comprise a fluidized bed. After mixing, the fluent powder passes through expansion chamber 38. Expansion chamber 38 may be considered an enlargement in the line carrying the fluidized powder, wherein the velocity of the fluidized powder is substantially decreased to insure that the fluent powder going to the coating apparatus 30 comprises an approximately homogeneous mixture of powder and air or gas.

Clear bulbs from a suitable supply 39 are preheated by any suitable means 41 and delivered to coating apparatus 30. As previously indicated, the preheating of the bulbs serves to render the glass conductive for discharging the charged particles as they come in contact with the glass, which is in contact with power supply 43.

After coating, depending upon the fit of the chuck in the neck of the bulb, it may be desirable to mechanically clean the necks of the bulbs by any suitable apparatus represented by block 45. Suitable apparatus includes, for example, a fine brush or a felt pad or other resilient wiping mechanism. The presence of the fine particles in the neck of the bulb is undesirable in the lower part of the neck where the mount, containing the filament structure and exhaust tube, is to be attached to the inside of the neck of the bulb since the fine particles tend to interfere with the fusion of the neck with the mount.

In utilizing an electrostatically deposited powder to form a light-diffusing coating on the interior of the bulb, the mechanical weaknesses introduced by the acid-etched operations are obviated. Further, additional coatings are unnecessary since the degree of diffusion or filament hiding is controlled by the amount of powder deposited per bulb. In using a powder in accordance with the present invention, further treatment of the bulb is unnecessary to achieve coating uniformity or adherence. Thus, the bulbs are essentially ready to be made into lamps following the actual coating operation.

As previously indicated, the particle size and resistivity of the powder have been found to be the parameters determining the quality of the coating. As specific examples of the permissible variation in particle size and resistivity, the following examples are given:

EXAMPLE 1

Particles having a particle size of 1.8 microns as measured with a Coulter counter and a resistivity of $10^9$ ohm-cm were coated with an electrostatic voltage of from 26–33 kv on an A-19 bulb with the result there was no blowoff when subjected to a jet of air at a gauge pressure of 1.03 bar ($1.03 \times 10^5$ pascals) through a 0.7-mm orifice 10 mm from the inside of the bulb.

EXAMPLE 2

Under the same conditions as in Example 1, 4-micron particles produced similar results.

EXAMPLE 3

Under the same conditions as the preceding examples, except the particle size was 7 microns, there was some blowoff of the particles, resulting in a circular area on the wall of the bulb which was distinctly less diffusing than the remainder of the bulb.

EXAMPLE 4

With respect to variation of resistivity, a powder comprising 2-micron particles having a resistivity of $10^8$ ohm-cm was coated with an electrostatic voltage of from 26–33 kv on an A-19 bulb with the result that there was no blowoff when subjected to a jet of air at a gauge pressure of 1.03 bar through a 0.7-mm orifice 10 mm from the inside of the bulb, the powder having been deposited at a rate of 65–100 mg of powder in 0.9 seconds.

EXAMPLE 5

Under the same conditions as Example 4, similar results were obtained with powder having a resistivity of $10^{11}$ ohm-cm.

Powders having a resistivity of $10^7$ ohm-cm and below or $10^{12}$ ohm-cm and above did not provide a suitable coating when deposited under manufacturing conditions. Thus, bulbs coated with powders having these resistivities were not tested for blowoff since the coatings were unacceptable.

EXAMPLE 6

Resistivities between $10^8$ and $10^{11}$ ohm-cm (inclusive) were obtained by calcining the powder for the following temperatures and times. Additional data is shown in the upper family of curves in FIG. 4 and in FIG. 5. The starting material comprised a wet silica powder having a resistivity of about $10^6$ ohm-cm. While the powder warmed up, it dried to less than 1.5% water by weight and the condensed hydroxyl sites that could be rehydrated were substantially eliminated. At the start of calcining, the resistivity of the powder had changed to greater than $10^{12}$ ohm-cm. The following data applies to a layer of powder about 1-cm deep.

| Time (at Temp.) | Temperature | Resistivity |
| --- | --- | --- |
| 5 minutes | 850° C | $8 \times 10^{11}$ ohm-cm |

-continued

| Time (at Temp.) | Temperature | Resistivity |
| --- | --- | --- |
| 5 minutes | 950° C | $5 \times 10^{10}$ |
| 10 minutes | 850° C | $1.2 \times 10^{11}$ |
| 10 minutes | 950° C | $1.5 \times 10^{10}$ |
| 15 minutes | 850° C | $4 \times 10^{10}$ |
| 15 minutes | 950° C | $2 \times 10^9$ |

EXAMPLE 7

Resistivities between $10^8$ and $10^{11}$ ohm-cm (inclusive) were obtained by mixing powders of different resistivities as follows:

| | Percentage by Weight | Resistivity | Resultant Resistivity |
| --- | --- | --- | --- |
| A | 70 | $1.1 \times 10^8$ | $4.5 \times 10^8$ |
|   | 30 | $1.7 \times 10^{10}$ | |
| B | 50 | $\sim 2 \times 10^{12}$ | $8.0 \times 10^9$ |
|   | 50 | $2.7 \times 10^8$ | |
| C | 50 | $\sim 2 \times 10^{12}$ | $8.0 \times 10^{10}$ |
|   | 50 | $5.2 \times 10^8$ | |

The foregoing description and specific examples disclose two ways in which the preferred resistivity in accordance with the present invention can be obtained: by calcining the powder for a predetermined time and by mixing two or more powders of different resistivities. The powders in the mixture need not have resistivities in the central area of the curve illustrated in FIG. 1, although the resulting resistivity must be within the central area, and none, one, or all of the powders may be calcined prior to mixing. Also, while many of the examples use LoVel 27 powder, it should be understood that the formulation necessary to achieve the preferred resistivity is an empirical process easily applied to other materials, such as, but not by way of limitation, those listed at the beginning of the description of the preferred embodiment.

Another way of achieving the desired resistivity, which may be used alone or with the mixing of powders, is to add a small percentage of resistivity reducing material. Such materials include triethylamine, $H_2SO_4$, $SO_2$, NaCl, $Na_2SO_4$, NaOH, or $Na_2O$. Adding sodium in the form of NaCl is preferred from the standpoint of cost, effectiveness, safety, and ecology.

It has been found, for example, that LoVel contains a small (0.6) percent by weight, or less, of sodium as received. In the following examples, and in FIGS. 4, 6 and 7, the amount of Na is the total. In general, the conductive additive reduces calcining time and temperature to achieve a given, reduced resistivity.

EXAMPLE 8

Starting with HySil having a resistivity in excess of $10^{12}$ ohm-cm and a sodium content of 1.2% by weight (1.0% added in the form of NaCl), calcining the powder at 850° C reduced the resistivity to $7.3 \times 10^9$ ohm-cm.

EXAMPLE 9

In a test similar to Example 8, except that $Na_2SO_4$ is added and the firing temperature was 915° C reduced resistivity to $7.9 \times 10^{10}$ ohm-cm.

EXAMPLE 10

Starting with LoVel 27 having a resistivity greater than $10^{12}$ ohm-cm, a 1.0% by weight Na content powder (0.4% added) was calcined at 880° C to produce a resistivity of $3.5 \times 10^8$ ohm-cm in 5 minutes.

A greater feel for the effects of calcining time, temperature, and conductive additive on resistivity may be obtained by considering FIGS. 4–7.

FIG. 4 illustrates two families of curves showing the relationship between resistivity and firing temperature. In each family, the members represent different firing times; 5, 10, and 15 minutes, respectively. The upper family of curves in FIG. 4 was obtained from a powder as received from a supplier, while the lower family of curves was obtained from a powder to which NaCl had been added. As can be seen from FIG. 4, increasing the firing temperature reduces the resultant resistivity of the powder; increasing the firing time also reduces the resultant resistivity of the powder; and adding a conductive material such as NaCl further reduces the resultant resistivity of the powder.

Figure 5:
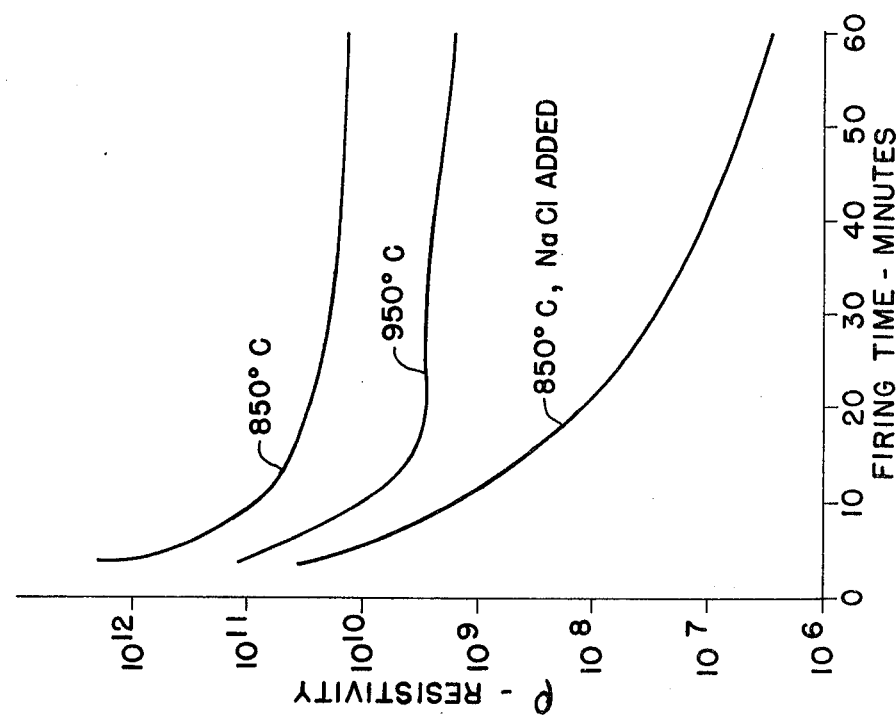
FIG. 5 illustrates the variation in resistivity with firing time.

FIG. 5 illustrates the relationship between the resistivity and firing time. In the uppermost curve of FIG. 5, the powder was calcined at 850° C, and the resistivity was reduced from greater than $10^{12}$ ohm-cm to slightly greater than $10^{10}$ ohm-cm. The middle curve indicates a variation in resistivity with firing time for a powder calcined at 950° C. The powders for both of these curves contained no conductive additive. As can be seen by inspection of FIG. 5, the decrease in resistivity levels off for these powders after approximately 20 minutes of calcining. In contrast, the bottom curve, concerning a powder to which two parts NaCl have been added, was calcined at 850° C, and the decrease in resistivity continued for as long as the powder was calcined. As with FIG. 4, FIG. 5 illustrates the reduction in firing time and resistivity obtained by adding a conductive additive to the powder.

Figure 6:
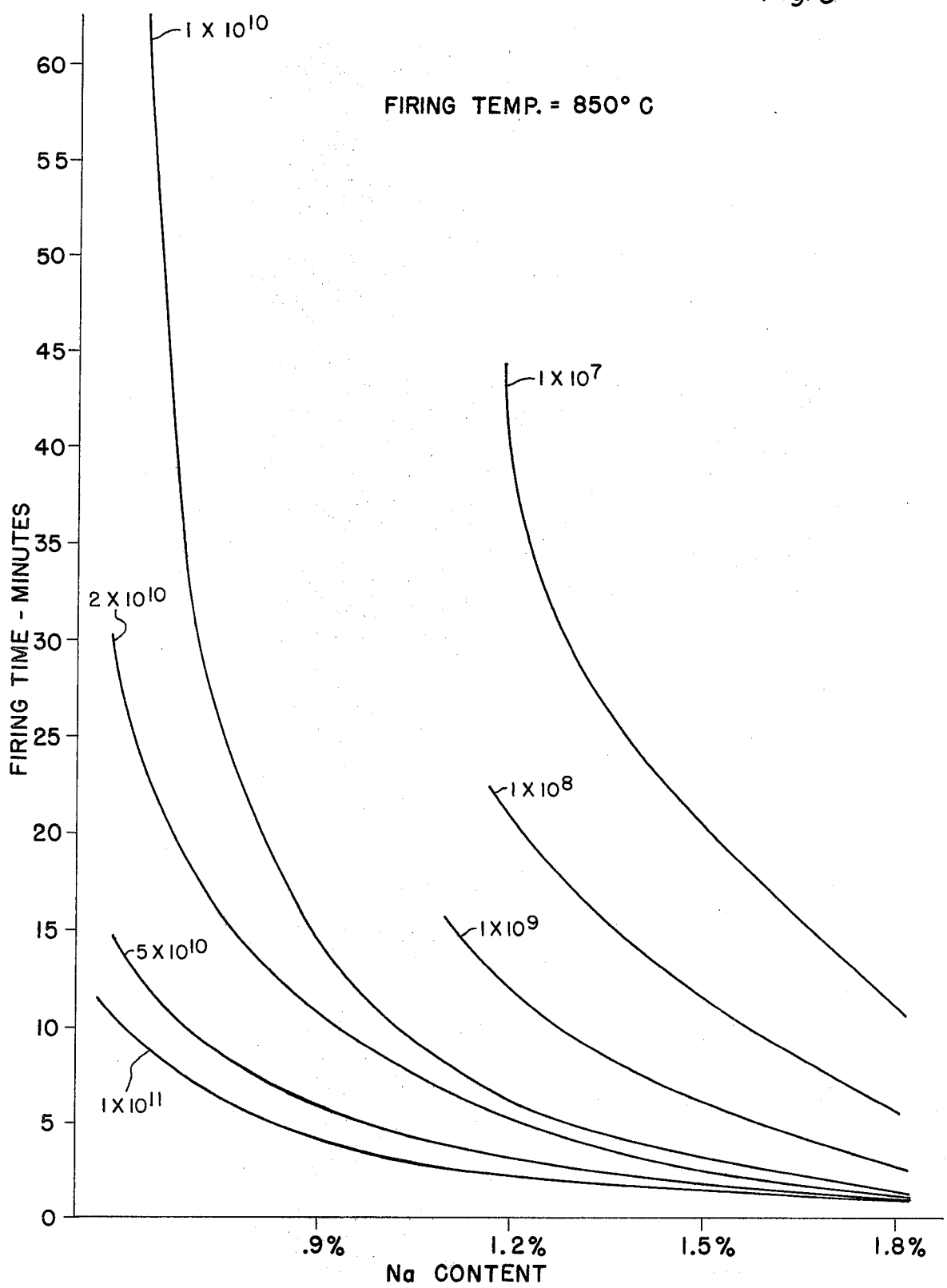
FIG. 6 illustrates the variation in firing time with changes in the amount of conductive material added.

FIG. 6 illustrates the variation of firing time with sodium content at a firing temperature of 850° C. In FIG. 6, the legend for the abscissa is in percent by weight of sodium, i.e., additive plus what was in as received. As can be seen from FIG. 6, at less than 0.9% the reduction in firing time is not as pronounced, and beyond 1.8% the reduction in firing time is too pronounced, requiring very precise control of the firing time.

Figure 7:
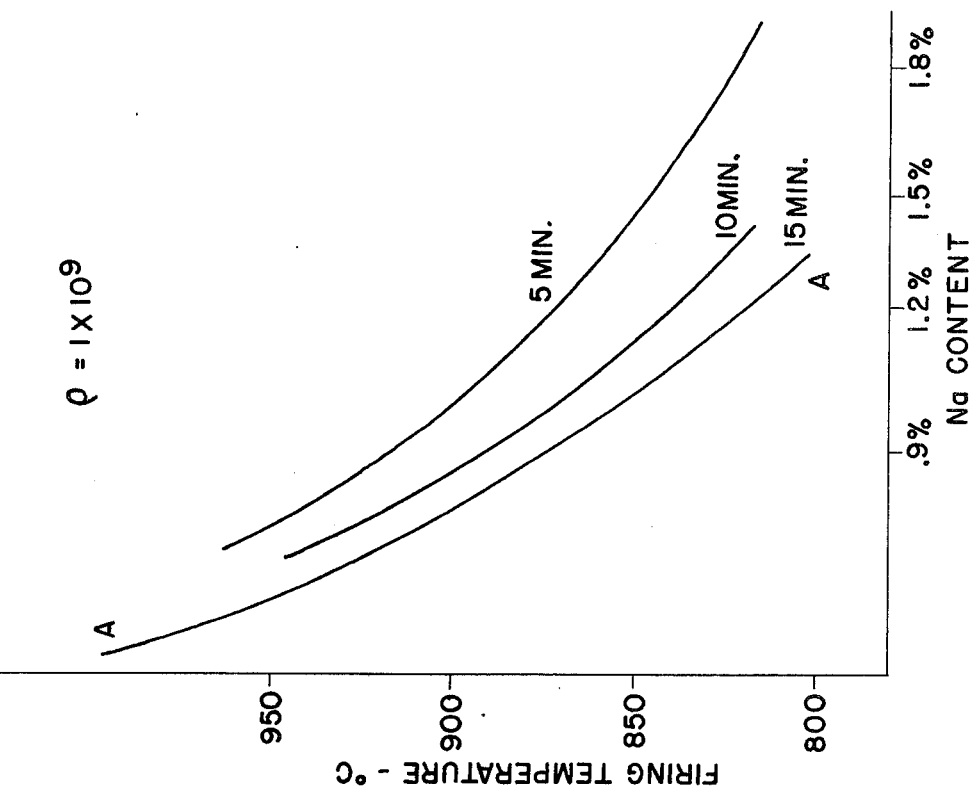
FIG. 7 illustrates the variation of firing temperature with the amount of conductive material added.

FIG. 7 illustrates the variation in firing temperature with sodium content. In FIG. 7, the resistivity of the powder is a constant $10^9$ ohm-cm. The curves illustrated in FIG. 7 represent firing times of 15, 10, and 5 minutes, reading from left to right. As indicated by the line A—A in FIG. 7, doubling the sodium content reduces the calcining temperature by approximately 150° C for a constant resistivity of $1 \times 10^9$ ohm-cm. It is not desirable to reduce the firing temperature below approximately 800° C because, while the added sodium has some effect, it becomes more fully active at 810° C, the melting point of NaCl.

There is thus provided by the present invention an improved powder for electrostatic coating. Electric lamp bulbs coated with this powder are structurally stronger than those etched or etched and coated in the prior art. In addition, the coating process, utilizing the powder of the present invention, is simplified as compared to the prior art in that no post-coating treatment of the bulbs is necessary. While, in addition to a preferred particle size, the particles must have a resistivity within a particular range, this does not eliminate particles of the proper size having a resistivity outside of the preferred range since the powders can be treated to obtain the proper resistivity; specifically, by calcining, by mixing powders of different resistivities, including resistivities outside the preferred range, and by adding a conductive additive to the powder. An additional benefit is obtained in using a conductive additive to reduce the resistivity of the powder since it has been found that not all batches of a particular powder will fire or calcine similarly. However, it has been found that the addition of a conductive additive smooths out the variations in the effect of calcining and simultaneously reduces the firing temperature. Thus, the powder in accordance with the present invention is efficient in the use of raw materials, the energy required to prepare the powder, and the number of process steps needed to utilize the powder to provide a light-diffusing coating for lamp bulbs.

Having thus described the invention, it will be apparent to those of ordinary skill in the art that various modifications can be made within the spirit and scope of the present invention.

What we claim as new and desire to secure by Letters Patent of the United States is:

1. An electric lamp comprising a bulb having a light-diffusing coating on the inside thereof comprising an electrostatically deposited powder comprising light refractive particles having a particle size of 1 to 4 microns and a resistivity of $10^8$ to $10^{11}$ ohm-centimeters.

2. The bulb as set forth in claim 1 wherein said powder consists essentially of silica.

3. A powder for electrostatically coating an electric lamp comprising light refractive particles having:
   a particle size of from 1 to 4 microns, and
   a resistivity of $10^8$ to $10^{11}$ ohm-centimeters.

4. The powder as set forth in claim 3 wherein said powder consists essentially of silica.

5. The powder as set forth in claim 4 comprising a mixture of powders of different resistivities wherein the mixture has a resistivity of from $10^8$ to $10^{11}$ ohm-centimeters.

6. The powder mixture as set forth in claim 5 wherein at least one of said powders has a resistivity outside of the range of $10^8$ to $10^{11}$ ohm-centimeters.

7. The powder as set forth in claim 4 and further comprising up to 1.8% by weight resistivity reducing material for reducing the resistivity of the powder.

8. The powder as set forth in claim 7 wherein said resistivity reducing material comprises a sodium compound.

9. The powder as set forth in claim 8 wherein said sodium compound comprises sodium chloride.

10. The powder as set forth in claim 4 having a resistivity of $10^8$ to $10^{10}$ ohm-centimeters.

11. The powder as set forth in claim 4 having a resistivity of $10^9$ to $10^{11}$ ohm-centimeters.

12. The powder as set forth in claim 3 wherein said powder consists essentially of a material selected from the group consisting of:
   alumina,
   silica,
   aluminosilica,
   calcium carbonate,
   and mixtures thereof.

* * * * *